Patented Feb. 15, 1927.

1,617,708

UNITED STATES PATENT OFFICE.

BERNARD GEHAUF AND HAROLD W. WALKER, OF EDGEWOOD, MARYLAND.

METHOD OF MAKING SILICOFLUORIDES AND PRODUCTS THEREOF.

No Drawing.   Application filed May 14, 1926.   Serial No. 109,161.

This invention relates to methods of making silicofluorides and products thereof; and it comprises a process of making preparations containing metallic silicofluorides and of light and fluffy nature, such preparations containing silica and being in the form of dried gels, wherein material containing a suitable base is treated with gaseous silicon fluorid in the presence of water, the resultant gel is lightly pressed and is then dried and comminuted; and it also comprises as a new composition of matter for insecticidal and other purposes, a light, fluffy, finely divided preparation in the nature of a dried gel containing a silicofluorid and also containing silica; all as more fully hereinafter set forth and as claimed.

Silicofluorides of the various metals, and particularly silicofluorid of sodium, are useful insecticidal materials, but have the disadvantage of being relatively dense. The silicofluorides are all rather insoluble, highly crystalline bodies and it has been considered impossible to prepare them in any amorphous or relatively light form, such as is desirable in an insecticide to be used in dust form. Their preparation is also relatively inconvenient and expensive. They can be made by double decomposition of a salt of a suitable base with a solution of sodium silicofluorid, but this is troublesome because of the slight solubility of the sodium compound. Usually, however, they are made by neutralizing hydrofluosilicic acid with the appropriate base; an operation of some difficulty because of the stated insolubility. Hydrofluosilicic acid may be made by direct action of hydrofluoric acid on silica; but ordinarily, it is prepared by contacting various waste gases containing silicon fluorid with water. Waste gases containing silicon fluorid arise in various industries, as in the manufacture of superphosphates. In speaking of gaseous silicon fluorid hereafter, we means to be understod as including waste gases of this character; that is, gases containing silicon fluorid. In the present invention we utilize silicon fluorid for direct preparation of insecticides containing silicofluorids.

Upon contact with water silicon fluorid decomposes, giving silica and hydrogen-silicon fluorid, or hydrofluosilicic acid, one-third of the silicon reappearing in the form of silica in gel form. We have found that if silicon fluorid be caused to react simultaneously with water and a basic body or salt, such as sodium carbonate, a similar action takes place with development of a gelled mixture of the desired silico-fluorid and silica. This gel upon drying gives an open-textured mass which can be comminuted to form a light and fluffy powder of desirable properties as an insecticide. Ordinarily, the silicofluorides are, as stated, highly crystalline bodies; but in this method of operation, their crystallization is restrained. The base-containing body used may be a chlorid, but it is more desirable to use carbonates or oxids. In using a chlorid, HCl is set free but this may be practically completely expelled during the subsequent drying. Sometimes, washing however is desirable. In using carbonates, the evolved $CO_2$ puffs up the gel and is of advantage in making the light, fluffy final material we desire.

In making sodium silicofluorid, we ordinarily employ sodium carbonate or soda ash. While caustic soda may be employed, its use offers no advantages over the carbonate and it is more expensive. With the soda ash we employ a certain amount of water, the amount not being very material as long as there is sufficient for the chemical reactions and to afford hydrating water for the gels produced. The sodium carbonate may be in solution or suspension. Into or over the wet or dissolved mass we lead gaseous silicon fluorid, or gases containing the same, as long as it is taken up. When using sodium carbonate, the end of the action may be ascertained by the use of any of the ordinary indicators not sensitive to $CO_2$, such as methyl orange. If introduction of silicon fluorid be continued beyond this point, higher proportions of silica will occur in the final product. Sometimes this is desirable; sometimes not. In the action, the water and the sodium carbonate are converted into a gel of silica and sodium silicofluorid. The whole mass may be jellied. The mass of gel is lightly pressed to get rid of some proportion of the mother liquor and is then dried in any convenient way. While air drying is feasible, drying at higher temperatures saves time. A temperature of 105° C. is suitable. After drying, the dry gel is comminuted in any convenient apparatus. The light fluffy mass resulting has an extremely low apparent specific gravity; usually lower than 1. It may be as low as 0.25. Using sodium carbonate as the base and introducing gaseous silicon fluorid until the reaction is complete, as evinced by indicators, the material made as described will carry nearly the theoretical proportions of silica and sodium silicofluorid. If the gases used contain, as is sometimes the case, HF, the proportions will be different. An ordinary preparation made as described will carry about 4 parts silicofluorid by weight for every part of silica. Both components are more or less hydrated; the amount of hydrate water remaining depending, of course, upon drying conditions. One particular preparation made in the way described and dried to constant weight at 105° C. prior to comminution was made with waste gases containing a small porportion of HF in addition to $SiF_4$. Upon analysis it showed an apparent specific gravity of 0.26, a content of 79.50 per cent of sodium silicofluorid and 19.61 per cent of silica; the residual 0.89 per cent being water and sodium fluorid.

Where gases rich in HF are used, some sodium silicate or silica can be used in conjunction with the sodium carbonate. Usually we desire at least the proportion of silica given by silicon fluorid.

Sodium chlorid may be used in lieu of sodium carbonate; but in this event, after completion of the reaction, some washing is desirable before pressing and drying. The washing is not necessary but is desirable. In using caustic soda in lieu of sodium carbonate, there is no $CO_2$ evolved and the gel produced does not contain bubbles.

In making barium silicofluorid, the procedure is exactly the same, save that barium carbonate is used. Barium hydrate or sulfid may be used. In making lead silicofluorid, either lead carbonate or oxid may be employed. In each case, the final material represents a light, fluffy powder in which the normal crystallinity of the silicofluorids is not in evidence, with contained silica gel intimately or molecularly distributed therethrough, in the sense that the material is not an intermixture of granules. All these preparations have the properties of a dried gel, as that word is commercially understood.

While the described method of making our novel insecticidal composition is regarded as the best, compositions having something the same physical properties may be made by treating a mixture of a silicate and a carbonate (or an oxid) with an aqueous solution of hydrofluosilicic acid. A 35 per cent solution is convenient. This method also gives a light product, although one not so light and fluffy as that given by the process described ante. In this instance the silicate gives the gel-forming silica.

A preparation made in this way using a concentrated solution containing silicate of soda and sodium carbonate and treating with commercial 35 per cent hydrofluosilicic acid, gave a final product with an apparent specific gravity of 0.27 and carrying about 20 per cent of silica.

The present method involving the production of a gel, the usual colloiding or peptizating agents may sometimes be used with advantage; such materials as agar-agar, gelatine, soaps, etc. Small proportions of these bodies, say up to a per cent or so, are sometimes useful.

What we claim is:—

1. The process of making insecticidal silicofluorid preparations which comprises passing silicon fluorid into contact with a basic body in the presence of water.

2. The process of making insecticidal silicofluorid preparations which comprises passing silicon fluorid into contact with sodium carbonate in the presence of water.

3. The process of making insecticidal silicofluorid preparations which comprises simultaneously producing hydrated silica and a silicofluorid in gel form, drying the gel and comminuting.

4. As a new insecticidal preparation, a dried gel containing sodium silicofluorid and silica.

In testimony whereof, we have hereunto affixed our signatures.

BERNARD GEHAUF.
HAROLD W. WALKER.